United States Patent
Shi

(10) Patent No.: US 10,036,874 B2
(45) Date of Patent: Jul. 31, 2018

(54) CAMERA LENS

(71) Applicant: Rongbao Shi, Shenzhen (CN)

(72) Inventor: Rongbao Shi, Shenzhen (CN)

(73) Assignee: AAC TECHNOLOGIES PTE. LTD, Singapore (SG)

( * ) Notice: Subject to any disclaimer, the term of this patent is extended or adjusted under 35 U.S.C. 154(b) by 80 days.

(21) Appl. No.: 15/416,927

(22) Filed: Jan. 26, 2017

(65) Prior Publication Data

US 2018/0052306 A1  Feb. 22, 2018

(30) Foreign Application Priority Data

Aug. 18, 2016  (CN) .......................... 2016 1 0679607

(51) Int. Cl.
  *G02B 13/00*  (2006.01)
  *G02B 9/60*  (2006.01)

(52) U.S. Cl.
  CPC .......... *G02B 13/0045* (2013.01); *G02B 9/60* (2013.01)

(58) Field of Classification Search
  CPC .................. G02B 13/0045; G02B 9/60
  See application file for complete search history.

(56) References Cited

U.S. PATENT DOCUMENTS

| | | | | |
|---|---|---|---|---|
| 7,864,454 B1 * | 1/2011 | Tang | ................. | G02B 13/0045 359/714 |
| 7,911,711 B1 * | 3/2011 | Tang | ................. | G02B 13/0045 359/715 |
| 8,000,031 B1 * | 8/2011 | Tsai | ................... | G02B 13/0045 359/714 |
| 8,675,289 B2 * | 3/2014 | Tsai | ................... | G02B 13/0045 359/708 |
| 8,705,181 B2 * | 4/2014 | Hsu | ................... | G02B 13/0045 359/714 |
| 8,786,962 B2 * | 7/2014 | Chen | ................. | G02B 13/0045 359/708 |
| 8,817,385 B2 * | 8/2014 | Tsai | ................... | G02B 13/0045 359/714 |
| 8,879,167 B2 * | 11/2014 | Kubota | ............. | G02B 13/0045 359/714 |
| 9,077,876 B2 * | 7/2015 | Chen | ..................... | H04N 5/2252 |
| 9,223,117 B2 * | 12/2015 | Chen | ..................... | H04N 5/335 |
| 9,274,314 B2 * | 3/2016 | Liao | ................... | G02B 13/0045 |
| 9,316,813 B2 * | 4/2016 | Jo | ............................ | G02B 9/60 |
| 9,547,158 B2 * | 1/2017 | Kondo | ............... | G02B 13/0045 |

(Continued)

*Primary Examiner* — Bumsuk Won
*Assistant Examiner* — Ephrem Mebrahtu
(74) *Attorney, Agent, or Firm* — Na Xu; IPro, PLLC

(57) ABSTRACT

The present disclosure provides a camera lens, including a first lens (focal length is f1), a second lens (focal length is f2), a third lens (focal length is f3), a fourth lens (focal length is f4) and a fifth lens (focal length is f5) which are successively arranged from an object side to an image side and which satisfy the following conditional expressions, $0.5 < f1/f < 0.7$, $-2 < f2/f < -0.5$, $1.6 < f3/f < 2.0$, $-2.1 < f4/f < -1.45$, $-1.5 < f5/f < -1.2$, in which, f is the focal length of the integral camera lens. Through reasonably optimizing surface type, allocating focal power and selecting optical material, the present disclosure designs a camera lens with a long focal length, which has the advantages of high sensitivity, low sensitivity, the chromatic aberration can be better calibrated, resulting in good optical performance.

10 Claims, 5 Drawing Sheets

(56) References Cited

U.S. PATENT DOCUMENTS

| | | | | |
|---|---|---|---|---|
| 9,638,837 B2* | 5/2017 | Yonezawa | | G02B 3/04 |
| 9,733,454 B2* | 8/2017 | Tsai | | G02B 13/0045 |
| 9,746,642 B2* | 8/2017 | Shin | | G02B 13/0045 |
| 9,772,742 B2* | 9/2017 | Guest | | G06F 3/0354 |
| 9,851,540 B2* | 12/2017 | Jhang | | G02B 13/005 |
| 2007/0229984 A1* | 10/2007 | Shinohara | | G02B 9/60 359/763 |
| 2012/0075721 A1* | 3/2012 | Konishi | | G02B 13/003 359/708 |
| 2012/0087020 A1* | 4/2012 | Tang | | G02B 13/0045 359/714 |
| 2012/0147482 A1* | 6/2012 | Tsai | | G02B 13/0045 359/714 |
| 2012/0257287 A1* | 10/2012 | Huang | | G02B 13/0045 359/714 |
| 2013/0057973 A1* | 3/2013 | Kubota | | G02B 13/0045 359/764 |
| 2013/0088788 A1* | 4/2013 | You | | G02B 13/0045 359/714 |
| 2013/0170048 A1* | 7/2013 | Lai | | G02B 13/0045 359/714 |
| 2013/0229718 A1* | 9/2013 | Tsai | | G02B 13/0045 359/714 |
| 2014/0055872 A1* | 2/2014 | Kondo | | G02B 13/0045 359/764 |
| 2014/0146402 A1* | 5/2014 | You | | G02B 13/0045 359/740 |
| 2014/0204480 A1* | 7/2014 | Jo | | G02B 13/0045 359/764 |
| 2014/0354876 A1* | 12/2014 | Shin | | G02B 9/60 348/360 |
| 2015/0138651 A1* | 5/2015 | Yonezawa | | G02B 3/04 359/714 |
| 2015/0185436 A1* | 7/2015 | Park, II | | G02B 13/0045 359/764 |
| 2015/0185447 A1* | 7/2015 | Cho | | H04N 5/2254 348/340 |
| 2015/0293332 A1* | 10/2015 | Kondo | | G02B 13/0045 359/714 |
| 2015/0309287 A1* | 10/2015 | Kondo | | G02B 13/0045 359/714 |
| 2016/0004045 A1* | 1/2016 | Kondo | | G02B 13/0045 359/714 |
| 2016/0004047 A1* | 1/2016 | Iwasaki | | G02B 9/34 359/714 |
| 2016/0109689 A1* | 4/2016 | Shin | | G02B 13/0045 359/714 |
| 2016/0116714 A1* | 4/2016 | Liao | | G02B 9/60 359/714 |
| 2016/0161723 A1* | 6/2016 | Lee | | G02B 13/18 348/335 |
| 2016/0178870 A1* | 6/2016 | Baik | | G02B 13/0045 359/714 |
| 2016/0274334 A1* | 9/2016 | Lee | | G02B 13/0045 |
| 2017/0102521 A1* | 4/2017 | Son | | G02B 1/04 |
| 2017/0343774 A1* | 11/2017 | Huang | | G02B 9/60 |

* cited by examiner

CAMERA LENS

TECHNICAL FIELD

The present disclosure relates to a camera lens and, particularly, relates to a camera lens for a portable electronic device.

BACKGROUND

In recent years, as the booming development of the miniaturized camera lens, the need on image acquisition module is increasing gradually. However, the photosensitive element of conventional camera lens is either a photosensitive coupling element or a complementary metallic oxide conductor element. With the development of semiconductor processing technique, the pixel size of the photosensitive element is further reduced. In addition, the electronic product at present is developed to have better functions and is lighter and thinner. Therefore, a miniaturized camera lens with better imaging quality has become the mainstream in the current market.

Since the distribution of refractive index of a first lens, a second lens, a third lens, a fourth lens and a fifth lens of the current five-piece camera lens is insufficient and the shape thereof is not ideal, which cannot achieve clearly imaging with long focal length. Moreover, there may exist defects such as high sensitivity, difficult to reduce optical length and the like.

Therefore, it is necessary to provide an improved five-piece camera lens so as to overcome the above-mentioned defects.

BRIEF DESCRIPTION OF DRAWINGS

In order to illustrate the technical solutions in embodiments of the present disclosure more clearly, a brief introduction of the accompanying drawings used in the embodiments will be provided hereinafter. Obviously, the drawings described below are merely a part of the embodiments of the present disclosure, those skilled in the art can also obtain other drawings according to these drawings without creative work.

Many aspects of the exemplary embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

In the figures:

FIG. 1 is a structural schematic diagram of a camera lens according to a preferred embodiment provided by the present disclosure;

FIG. 2 is a schematic diagram of field curvature of the camera lens shown in FIG. 1;

FIG. 3 is a schematic diagram of distortion of the camera lens shown in FIG. 1;

FIG. 4 is a schematic diagram of distortion of field curvature of the camera lens shown in FIG. 1;

FIG. 5 is a schematic diagram of defocusing curve of the camera lens shown in FIG. 1.

DESCRIPTION OF EMBODIMENTS

The technical solutions in the embodiments of the present disclosure will be described clearly and completely combining the drawings in the embodiments of the present disclosure. Obviously, the described embodiments are only a part of the embodiments of the present disclosure, but not all of them. Based on the embodiments in the present disclosure, all other embodiments obtained by those skilled in the art without creative work shall belong to the protection scope of the present disclosure.

Figure 1:
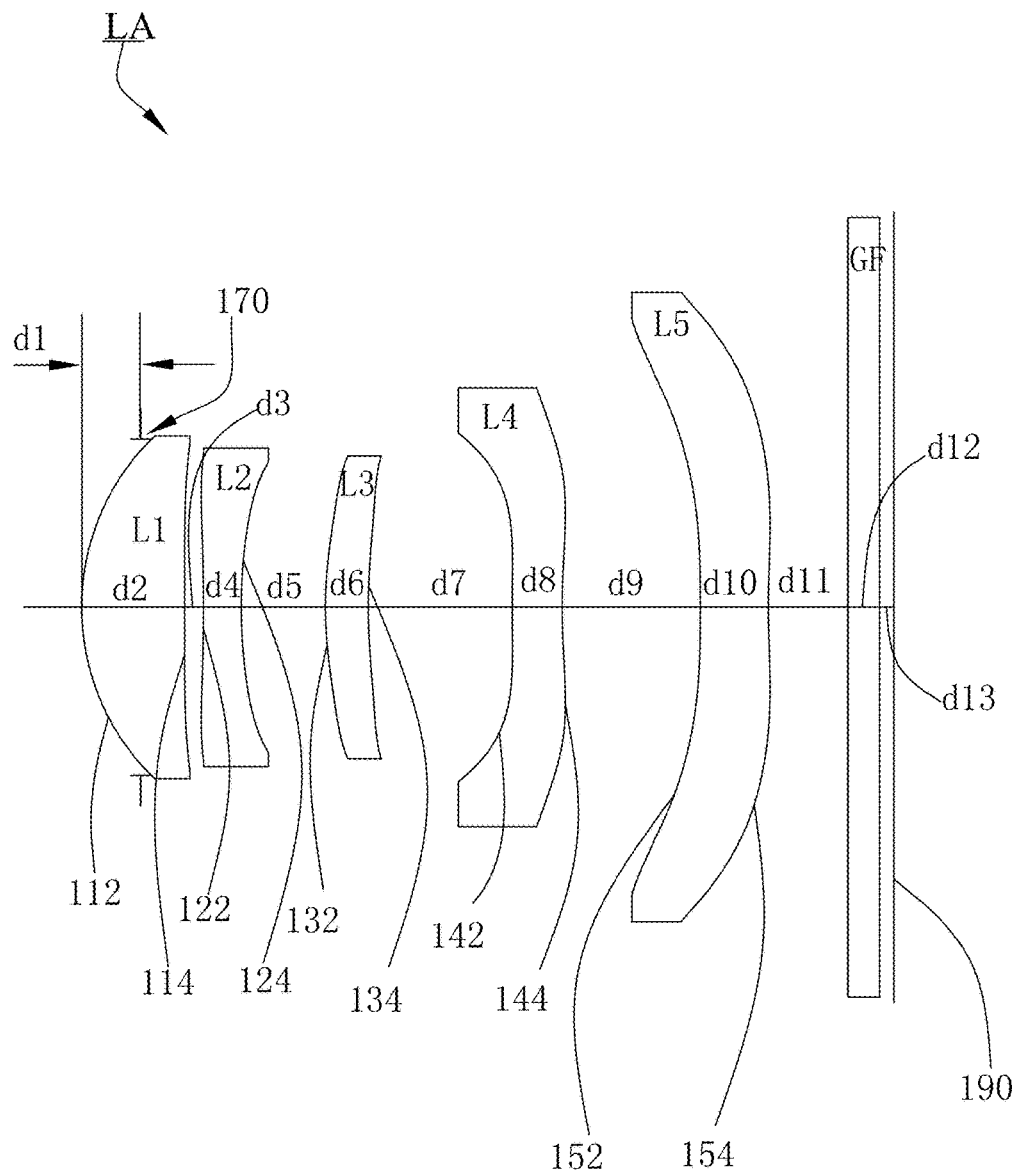

Referring to FIG. 1, which is a structural schematic diagram of a camera lens according to a preferred embodiment provided by the present disclosure. In FIG. 1, the left side is the object side, the right side is the image side. The camera lens LA is composed of five pieces of lenses which are coaxially arranged, i.e., a first lens L1, a second lens L2, a third lens L3, a fourth lens L4 and a fifth lens L5 which are successively arranged from the object side to the image plane 190. An aperture 170 is arranged on the object-side surface of the first lens L1, a glass plate GF is arranged between the fifth lens L5 and the image plane 190.

In the present embodiment, the above-mentioned five lenses are all plastic lenses, the structure of which is as follows:

The first lens L1 is a positive lens, which has positive focal power, the object-side surface 112 is a convex surface, the image-side surface 114 is a concave surface. In addition, the object-side surface 112 and the image-side surface 114 are aspheric surfaces, the image-side surface 114 of the first lens L1 is provided with three inflection points;

The second lens L2 is a negative lens, which has negative focal power, the object-side surface 122 is a concave surface, and the image-side surface 124 is concave surface. In addition, the object-side surface 122 and the image-side surface 124 are aspheric surfaces, the image-side surface 124 of the second lens L2 is provided with two inflection points and a stationary point;

The third lens L3 is a positive lens, which has positive focal power, the object-side surface 132 is a convex surface, the image-side surface 134 is a concave surface. In addition, the object-side surface 132 and the image-side surface 134 are aspheric surfaces, the image-side surface 134 of the third lens L3 is provided with two inflection points;

The fourth lens L4 is a negative lens, which has negative focal power, the object-side surface 142 is a convex surface, and the image-side surface 144 is a concave surface. In addition, the object-side surface 142 and the image-side surface 144 are aspheric surfaces, the object-side surface 142 of the fourth lens L4 is provided with an inflection point and a stationary point, the image-side surface 144 thereof is provided with three inflection points and a stationary point;

The fifth lens L5 is a negative lens, which has negative focal power, the object-side surface 152 is a concave surface, and the image-side surface 154 is a concave surface. In addition, the object-side surface 152 and the image-side surface 154 are aspheric surfaces, the object-side surface 152 of the fifth lens L5 is provided with an inflection point, the image-side surface 154 thereof is provided with two inflection points and a stationary point;

The object-side surface is a convex surface means that the object-side surface forms a convex shape towards the object; the object-side surface is a concave surface means that the object-side surface forms a concave shape towards the object; the image-side surface is a convex surface means that the image-side surface forms a convex shape towards the image surface; the image-side surface is a concave surface means that the image-side surface forms a concave shape towards the image surface.

The aperture 170 is arranged in the direction of the object-side surface 112 of the first lens L1 close to the object side, which is configured to control light amount and field depth. A glass cover or glass filter can be adopted as the glass plate GF, the glass filter has the function of light filtering, the type can be selected according to the actual demands. It is also possible that a glass plate GF is not arranged between the fifth lens L5 and the image plane 190.

In the camera lens LA provided by the present disclosure, in order to achieve the design requirements on the high sharpness of imaging and long focal length of the camera lens LA, the first lens L1, the second lens L2, the third lens L3, the fourth lens L4 and the fifth lens L5 of the camera lens LA need to satisfy the following conditional expressions:

$$0.5 < f1/f < 0.7 \quad (1);$$

$$-2 < f2/f < -0.5 \quad (2);$$

$$1.6 < f3/f < -2.0 \quad (3);$$

$$-2.1 < f4/f < -1.45 \quad (4);$$

$$-1.5 < f5/f < -1.2 \quad (5);$$

in which,
f: focal length of the integral camera lens;
f1: focal length of the first lens;
f2: focal length of the second lens;
f3: focal length of the third lens;
f4: focal length of the fourth lens;
f5: focal length of the fifth lens.

The conditional expressions (1)-(5) define the focal lengths of the first lens L1, the second lens L2, the third lens L3, the fourth lens L4 and the fifth lens L5. It is difficult for the lens with long focal length to be miniaturized and achieve clear imaging beyond the conditional expressions (1)-(5).

Moreover, in order that the camera lens LA can possess advantages of short optical length, low sensitivity, small pixel chromatic aberration and low cost, it is preferred that the parameters of the first lens L1, the second lens L2, the third lens L3, the fourth lens L4 and the fifth lens L5 are designed within the following ranges:

I. Focal Length:

In the integral structure of the camera lens LA, the focal lengths of the first lens L1, the second lens L2, the third lens L3, the fourth lens L4 and the fifth lens L5 of the camera lens LA need to satisfy the following conditions:

1.5 mm<f1<3.0 mm, −5 mm<f2<−2 mm, 8 mm<f3<15 mm, −12 mm<f4<−2 mm, −10 mm<f5<−4 mm.

II. Refractive Index

In the integral structure of the camera lens LA, the refractive indexes of the first lens L1, the second lens L2, the third lens L3, the fourth lens L4, the fifth lens L5, a sixth lens 160 and a seventh lens 170 of the camera lens LA need to satisfy the following conditions:

1.50<n1<1.55, 1.60<n2<1.70, 1.60<n3<1.70, 1.50<n4<1.55, 1.50<n5<1.55;

in which,
n1: refractive index of the first lens;
n2: refractive index of the second lens;
n3: refractive index of the third lens;
n4: refractive index of the fourth lens;
n5: refractive index of the fifth lens.

III. Abbe Number

In the integral structure of the camera lens LA, the Abbe numbers of the first lens L1, the second lens L2, the third lens L3, the fourth lens L4, the fifth lens L5, the sixth lens 160 and the seventh lens 170 of the camera lens LA need to satisfy the following conditions:

40<v1<60, 15<v2<30, 15<v3<30, 40<v4<60, 40<v5<60;

in which,
v1: Abbe number of the first lens;
v2: Abbe number of the second lens;
v3: Abbe number of the third lens;
v4: Abbe number of the fourth lens;
v5: Abbe number of the fifth lens.

If the focal lengths, refractive indexes and the Abbe numbers of the first lens L1, the second lens L2, the third lens L3, the fourth lens L4, the fifth lens L5 do not conform the above-mentioned conditions, the chromatic aberration characteristic and the telecentric characteristic of the camera lens LA may be degraded, which also increases the sensitivity of the camera lens LA, and thus it is difficult to achieve miniaturization of the camera lens LA or reduce the cost of the camera lens LA.

The first lens L1 is a positive lens, which undertakes the main focal power of the camera lens LA, so as to reduce the total length of the system. Both the second lens L2 and the third lens L3 adopt a material with high refractive index and low Abbe number, so as to reasonably calibrate the system chromatic aberration. The fourth lens L4 and the fifth lens L5 are negative lens, which can reduce the field curvature of the system. Since the five lenses of the camera lens LA all possess the above-mentioned structure and satisfy all the conditional expressions, the manufactured camera lens LA possesses excellent optical characteristics, with a long focal length system miniaturized to be f/TTL<1.07 and with high sensitivity to be FNo≤2.6, in which the TTL (i.e., optical length) refers to the distance from the object-side surface of the first lens L1 to the image-side surface of the first lens L1; FNo (i.e., F value) refers to the ratio of the focal length of the integral camera lens to the entrance pupil diameter.

The camera lens LA of the present disclosure will be described with reference to the embodiments as follows. The symbols recorded in the embodiments are as follows. Unit of distance, radius and center thickness is mm.

f: focal length of the integral camera lens;
f1: focal length of the first lens;
f2: focal length of the second lens;
f3: focal length of the third lens;
f4: focal length of the fourth lens;
f5: focal length of the fifth lens;
FNo: F value;
2ω: comprehensive angle;
S1: aperture;
R: curvature radius of optical surface, or center curvature radius when being lens;
R1: curvature radius of object-side surface of the first lens L1;
R2: curvature radius of image-side surface of the first lens L1;
R3: curvature radius of object-side surface of the second lens L2;
R4: curvature radius of image-side surface of the second lens L2;
R5: curvature radius of object-side surface of the third lens L3;
R6: curvature radius of image-side surface of the third lens L3;
R7: curvature radius of object-side surface of the second lens L4;
R8: curvature radius of image-side surface of the second lens L4;
R9: curvature radius of object-side surface of the third lens L5;

R10: curvature radius of image-side surface of the third lens L5;

R11: curvature radius of object-side surface of the glass plate GF;

R12: curvature radius of image-side surface of the glass plate GF;

d: distance between the center thickness of the lens and the lens;

d1: axial distance from the aperture S1 to the object-side surface of the first lens L1;

d2: center thickness of the first lens L1;

d3: axial distance from the image-side surface of the first lens L1 to the object-side surface of the second lens L2;

d4: center thickness of the second lens L2;

d5: axial distance from the image-side surface of the second lens L2 to the object-side surface of the second lens L3;

d6: center thickness of the third lens L3;

d7: axial distance from the image-side surface of the third lens L3 to the object-side surface of the fourth lens L4;

d8: center thickness of the fourth lens L4;

d9: axial distance from the image-side surface of the fourth lens L4 to the object-side surface of the fifth lens L5;

d10: center of the fifth lens L5;

d11: axial distance from the image-side surface of the fifth lens L5 to the object-side surface of the glass plate GF;

d12: center thickness of the glass plate GF;

d13: axial distance between the image-side surface of the glass plate GF to the image plane;

nd: refractive index of line d;

nd1: refractive index of line d of the first lens L1;

nd2: refractive index of line d of the second lens L2;

nd3: refractive index of line d of the third lens L3;

nd4: refractive index of line d of the fourth lens L4;

nd5: refractive index of line d of the fifth lens L5;

nd6: refractive index of line d of the glass plate GF;

in which, R is the curvature radius on the axis, k is cone coefficient, A4, A6, A8, A10, A12, A14, A16 are aspheric surface coefficients.

For convenience, each aspheric surface of the lens surface adopts the aspheric surface shown in conditional expression (6), but is not limited to the polynomial form of the aspheric surface of the conditional expression (6).

FIG. 1 is a structural schematic diagram of the present embodiment. Table 1 shows the curvature radius R of the object side and the image side of the first-fifth lenses L1-L5 which constitute the camera lens LA, the center thickness of the lens or the distance d between lenses, the refractive index nd and the Abbe number v. Table 2 shows the cone coefficient k and the aspheric surface coefficient. Table 3 lists the values in the embodiments and values corresponding to the parameters specified in conditional expressions (1)-(5) in the embodiments.

TABLE 1

|  | R | d |  | nd |  | v |  |
|---|---|---|---|---|---|---|---|
| S1 | ∞ | d1 = | −0.390 |  |  |  |  |
| R1 | 1.60153 | d2 = | 0.681 | nd1 | 1.5439 | v 1 | 55.95 |
| R2 | 182.79410 | d3 = | 0.124 |  |  |  |  |
| R3 | −22.00695 | d4 = | 0.250 | nd2 | 1.6614 | v 2 | 20.41 |
| R4 | 3.14739 | d5 = | 0.557 |  |  |  |  |
| R5 | 2.55542 | d6 = | 0.288 | nd3 | 1.6614 | v 3 | 20.41 |
| R6 | 3.78355 | d7 = | 0.953 |  |  |  |  |
| R7 | 15.90393 | d8 = | 0.330 | nd4 | 1.5439 | v 4 | 55.95 |
| R8 | 4.40778 | d9 = | 0.917 |  |  |  |  |
| R9 | −25.90169 | d10 = | 0.450 | nd5 | 1.5439 | v 5 | 55.95 |
| R10 | 5.61687 | d11 = | 0.526 |  |  |  |  |
| R11 | ∞ | d12 = | 0.210 | nd6 | 1.5168 | v 6 | 56.17 |
| R12 | ∞ | d13 = | 0.094 |  |  |  |  |

TABLE 2

|  | cone coefficient | Aspheric coefficient | | | | | | |
|---|---|---|---|---|---|---|---|---|
|  | k | A4 | A6 | A8 | A10 | A12 | A14 | A16 |
| R1 | 0.04230473 | 9.7077E−04 | −1.4202E−03 | 8.8851E−03 | −4.8630E−03 | −5.8069E−03 | 8.6076E−03 | −2.9632E−03 |
| R2 | −90 | −3.1863E−02 | 1.7557E−01 | −2.8484E−01 | 3.1401E−01 | −2.4536E−01 | 1.2610E−01 | 3.1452E−02 |
| R3 | −59.82893 | −1.2869E−01 | 4.9136E−01 | −8.5202E−01 | 9.8686E−01 | −7.4062E−01 | 3.3415E−01 | −7.0844E−02 |
| R4 | −2.399049 | −1.2770E−01 | 4.7049E−01 | −8.6061E−01 | 1.2596E+00 | −1.2281E+00 | 7.3638E−01 | −1.9853E−01 |
| R5 | −18.6243 | −5.6382E−03 | −1.0357E−01 | 2.7696E−01 | −3.9926E−01 | 4.2586E−01 | −2.3066E−01 | 4.8216E−02 |
| R6 | −62.5877 | 9.2548E−03 | −1.7835E−01 | 3.6556E−01 | −4.0491E−01 | 3.0588E−01 | −1.0803E−01 | 1.4860E−02 |
| R7 | 90 | −2.2872E−01 | 5.2269E−01 | −1.9276E−01 | 3.2922E−01 | −3.5696E−01 | 2.2482E−01 | −5.8021E−02 |
| R8 | −85.4378 | −5.9419E−02 | −9.8748E−02 | 1.3944E−01 | −1.1757E−01 | 6.6325E−02 | −1.9898E−02 | 2.3286E−03 |
| R9 | 43.38987 | −0.16002464 | 0.14710573 | −0.087759017 | 0.029969611 | −0.005552898 | 0.000519697 | −1.89382E−05 |
| R10 | 2.669494 | −0.20448145 | 0.14418739 | −0.072286558 | 0.022793638 | −0.004444201 | 0.000485995 | −2.23159E−05 | v: Abbe number v1: Abbe number of the first lens L1;

v2: Abbe number of the second lens L2;

v3: Abbe number of the third lens L3;

v4: Abbe number of the fourth lens L4;

v5: Abbe number of the fifth lens L5;

v6: Abbe number of the glass plate GF;

TTL: optical length (axial distance from the object-side surface of the first lens L1 to the imaging surface);

LB: axial distance from the image-side surface of the fifth lens L5 to the imaging surface (including the thickness of the glass plate GF);

IH: image height $$y=(x^2/R)/[1+\{1-(k+1)(x^2/R^2)\}^{1/2}]+A4x^4+A6x^6+A8x^8+A10x^{10}+A12x^{12}+A14x^{14}+A16x^{16}$$ (6)

TABLE 3

|  | Embodiment | Remark |
|---|---|---|
| f1/f | 0.51 | Conditional expression (1) |
| f2/f | −0.71 | Conditional expression (2) |
| f3/f | 1.86 | Conditional expression (3) |
| f4/f | −1.95 | Conditional expression (4) |
| f5/f | −1.45 | Conditional expression (5) |
| f1 | 2.96 |  |
| f2 | −4.11 |  |
| f3 | 10.79 |  |
| f4 | −11.29 |  |
| f5 | −8.42 |  |
| f | 5.80 |  |
| EFL/TTL | 1.1 |  |
| Fno | 2.6 |  |

TABLE 3-continued

| | Embodiment | Remark |
|---|---|---|
| 2ω | 47.8 | |
| LB | 0.83 | |
| TTL | 5.38 | |

Figure 2:
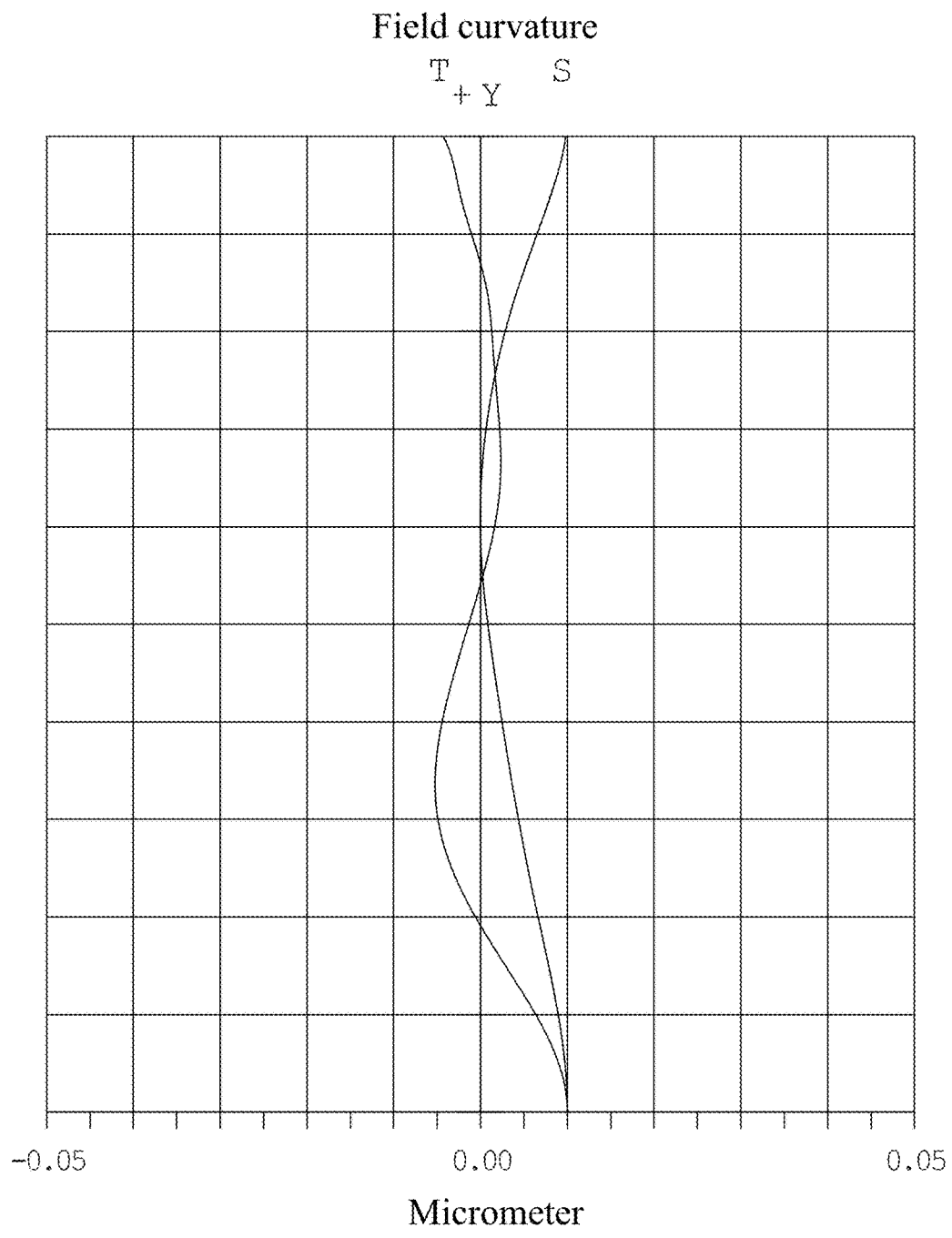
Figure 3:
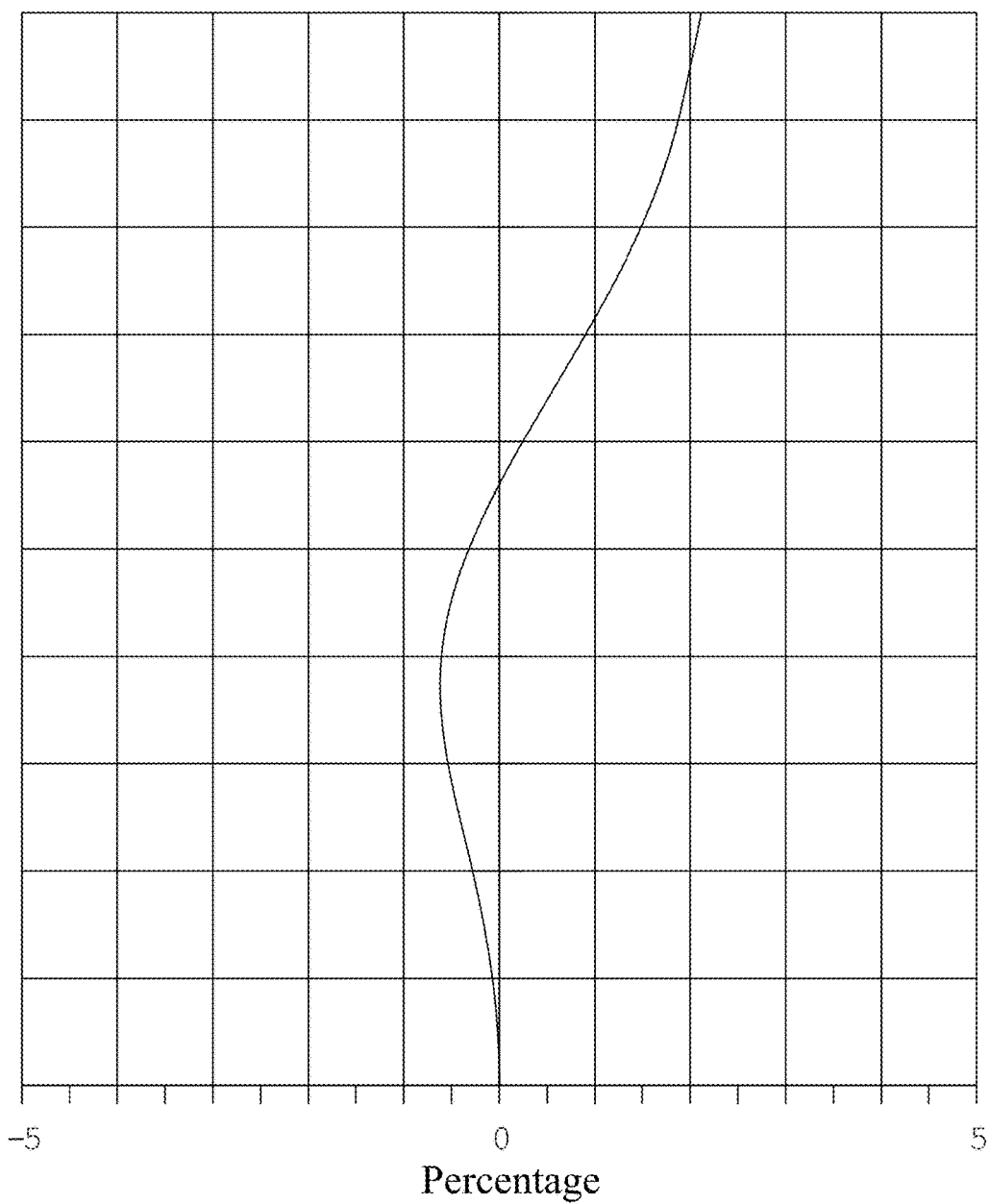
Figure 4:
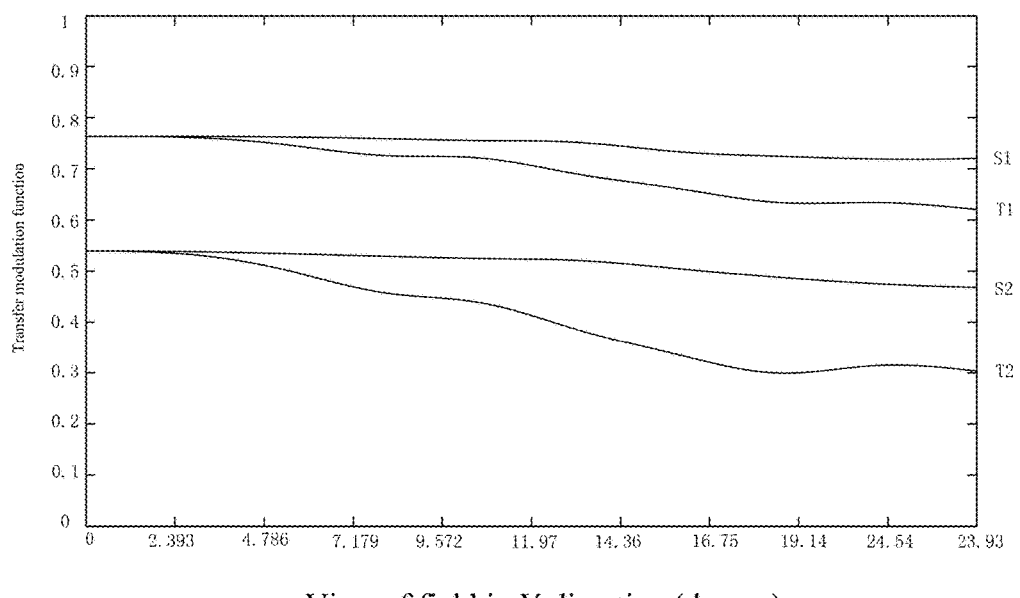
Figure 5:
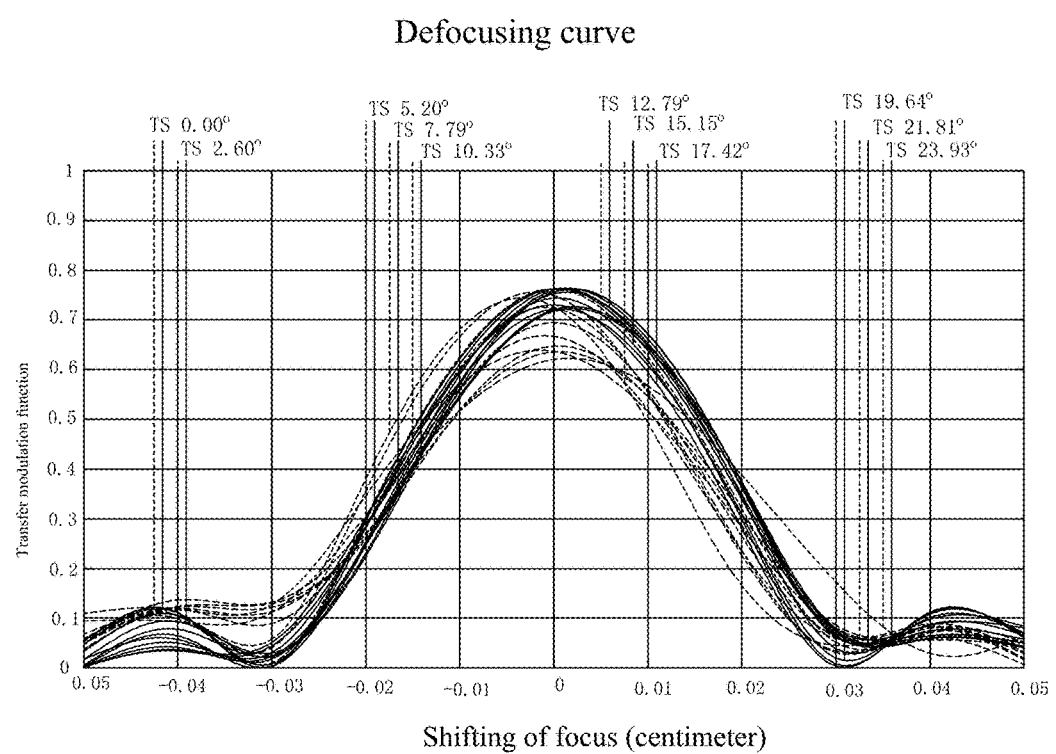

Referring to FIG. 2, FIG. 3, FIG. 4 and FIG. 5, FIG. 2 is a schematic diagram of field curvature of the camera lens shown in FIG. 1, FIG. 3 is a schematic diagram of distortion of the camera lens shown in FIG. 1, FIG. 4 is a schematic diagram of distortion of field curvature of the camera lens shown in FIG. 1; FIG. 5 is a schematic diagram of defocusing curve of the camera lens shown in FIG. 1. Besides, the field curvature S in FIG. 2 is the field curvature in a sagittal direction, T is the field curvature in meridian direction; T1 and S1 in FIG. 4 are respectively the field of view MTF curve in the meridian and sagittal direction of 100 lp/mm (line pairs/millimeter), T2 and S2 in FIG. 4 are respectively the field of view MTF curve in the meridian and sagittal direction of 200 lp/mm. As shown in FIG. 2, FIG. 3, FIG. 4 and FIG. 5, the camera lens LA provided by the present disclosure possesses higher optical performance.

The camera lens LA provided by the present disclosure has the following beneficial effects:

Through reasonably optimizing the surface type, allocating focal power and selecting optical material, the present disclosure designs a camera lens with a long focal length which is suitable for a micro electronic device with clear imaging performance, the first lens L1 is a positive lens, which undertakes the main focal power of the camera lens LA, so as to effectively reduce the length of the system; the second lens L2 and the third lens L3 adopt a material with high refractive index and low Abbe number, so as to effectively reduce the chromatic aberration of the system, the fourth lens L4 and the fifth lens L5 are negative lenses, so as to reduce the field curvature of the system, so that the camera lens LA has a low sensitivity and a better light amount while obtaining a high imaging performance, and also has the following optical characteristics: 2ω=47.8°, long focal system miniaturized to be f/TTL<1.07, and a high sensitivity of FNo≤2.6.

The above are merely the preferred embodiments of the present disclosure, which will not limit the present disclosure, for those skilled in the art, the present disclosure can have various modifications and variations. Any modifications, equivalent replacements and improvements made within the spirit and principle of the present disclosure shall fall in the protection scope of the present disclosure.

What is claimed is:

1. A camera lens, comprising from an object side to an image side:
   a first lens having a positive refractive index;
   a second lens having a negative refractive index;
   a third lens having a positive refractive index;
   a fourth lens having a negative refractive index; and
   a fifth lens having a negative refractive index;
   wherein the first, second, third, fourth and fifth lenses satisfy following conditional expressions (1)-(5):

$0.5<f1/f<0.7$ (1);

$-2<f2/f<-0.5$ (2);

$1.6<f3/f<-2.0$ (3);

$-2.1<f4/f<-1.45$ (4);

$-1.5<f5/f<-1.2$ (5);

wherein,
   f: focal length of the integral camera lens;
   f1: focal length of the first lens;
   f2: focal length of the second lens;
   f3: focal length of the third lens;
   f4: focal length of the fourth lens;
   f5: focal length of the fifth lens.

2. The camera lens as described in claim 1, wherein, the camera lens further satisfies following conditional expressions (1a)-(5a):

$1.5\text{ mm}<f1<3.0\text{ mm}$ (1a);

$-5\text{ mm}<f2<-2\text{ mm}$ (2a);

$8\text{ mm}<f3<15\text{ mm}$ (3a);

$-12\text{ mm}<f4<-2\text{ mm}$ (4a);

$-10\text{ mm}<f5<-4\text{ mm}$ (5a).

3. The camera lens as described in claim 1, wherein, the camera lens further satisfies following conditional expressions (1b)-(5b):

$1.50<n1<1.55$ (1b);

$1.60<n2<1.70$ (2b);

$1.60<n3<1.70$ (3b);

$1.50<n4<1.55$ (4b);

$1.50<n5<1.55$ (5b);

wherein,
   n1: refractive index of the first lens;
   n2: refractive index of the second lens;
   n3: refractive index of the third lens;
   n4: refractive index of the fourth lens;
   n5: refractive index of the fifth lens.

4. The camera lens as described in claim 1, wherein, the camera lens further satisfies following conditional expressions (1c)-(5c):

$40<v1<60$ (1c);

$15<v2<30$ (2c);

$15<v3<30$ (3c);

$40<v4<60$ (4c);

$40<v5<60$ (5c);

wherein,
   v1: Abbe number of the first lens;
   v2: Abbe number of the second lens;
   v3: Abbe number of the third lens;
   v4: Abbe number of the fourth lens;
   v5: Abbe number of the fifth lens.

5. The camera lens as described in claim 1, wherein, the first lens is a positive focal power lens, which undertakes main focal power of the camera lens, so as to reduce optical length, the focal length thereof satisfies conditional expression: $1.5\text{ mm}<f1<3.0\text{ mm}$.

6. The camera lens as described in claim 1, wherein, the second lens and the third lens adopt a high refractive index and a material with a low Abbe number, so as to reasonably calibrate chromatic aberration of a system, the second lens satisfies conditional expressions: $1.60<n2<1.70$ and $15 < v2 < 30$, the third lens satisfies conditional expressions: $1.60 < n3 < 1.70$ and $15 < v3 < 30$;

wherein,
n2: refractive index of the second lens;
n3: refractive index of the third lens;
v2: Abbe number of the second lens;
v3: Abbe number of the third lens.

7. The camera lens as described in claim 1, wherein, the fourth lens and the fifth lens are negative lenses, so as to effectively reduce field curvature of a system, the fourth lens satisfies conditional expression: $-12 \text{ mm} < f4 < -2 \text{ mm}$, the fifth lens satisfies conditional expression: $-10 \text{ mm} < f5 < -4 \text{ mm}$.

8. The camera lens as described in claim 1, wherein, a ratio of the focal length of the camera lens to a total optical length further satisfies following conditional expression:

$$f/TTL < 1.07;$$

wherein,
f: focal length of the integral camera lens:
TTL: distance from an object-side surface of the first lens to an imaging surface.

9. The camera lens as described in claim 1, wherein, an F value FNo of the camera lens further satisfies following conditional expression: $FNo \leq 2.6$;

wherein, FNo is a ratio of a total focal length of the camera lens to an entrance pupil diameter.

10. The camera lens as described in claim 1, wherein, the camera lens further comprises an aperture arranged on a side of an object-side surface of the first lens towards the object side.

* * * * *